(12) United States Patent
Pfeiffer et al.

(10) Patent No.: US 7,293,351 B2
(45) Date of Patent: Nov. 13, 2007

(54) APPARATUS FOR PROTECTING AND MERGING A HEAD STACK ASSEMBLY

(75) Inventors: Michael W. Pfeiffer, Savage, MN (US); Dennis R. Nielsen, Apple Valley, MN (US); Thomas P. O'Neill, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 213 days.

(21) Appl. No.: 10/817,609

(22) Filed: Apr. 2, 2004

(65) Prior Publication Data

US 2005/0223547 A1    Oct. 13, 2005

(51) Int. Cl.
B23P 19/00    (2006.01)
G11B 21/08    (2006.01)

(52) U.S. Cl. .................. 29/737; 29/603.01; 29/603.02; 29/603.03; 29/430; 29/729; 360/266.1

(58) Field of Classification Search .................. 29/737, 29/729, 603.03, 603.01, 593, 430, 603.02; 360/266.1, 265.7, 265.9

See application file for complete search history.

(56) References Cited

U.S. PATENT DOCUMENTS

| | | | |
|---|---|---|---|
| 4,376,294 A * | 3/1983 | Meier et al. ............. | 360/255.9 |
| 4,851,943 A | 7/1989 | Perry | |
| 4,862,584 A | 9/1989 | Budy | |
| 4,985,793 A * | 1/1991 | Anderson ................ | 360/256.2 |
| 5,150,512 A | 9/1992 | Hatchhett | |
| 5,465,476 A | 11/1995 | Krajec | |
| 5,471,733 A | 12/1995 | Bernett | |
| 5,482,164 A | 1/1996 | Karns | |
| 5,540,542 A | 7/1996 | Krajec | |
| 5,592,289 A | 1/1997 | Norris | |
| 5,668,683 A * | 9/1997 | Stone ...................... | 360/256.1 |
| 5,692,289 A | 12/1997 | Amada | |
| 5,757,586 A * | 5/1998 | Budde ..................... | 360/244.6 |
| 5,826,325 A | 10/1998 | Price | |
| 5,982,587 A * | 11/1999 | Alagheband et al. ....... | 360/256 |
| 5,984,104 A | 11/1999 | Schott | |
| 6,014,290 A | 1/2000 | Supramaniam | |
| 6,049,969 A | 4/2000 | Jenkins | |
| 6,163,439 A | 12/2000 | Jeong | |
| 6,185,075 B1 * | 2/2001 | Tsujino et al. ........... | 360/265.7 |
| 6,191,345 B1 | 2/2001 | Arthur | |
| 6,452,753 B1 | 9/2002 | Hiller | |
| 6,577,473 B1 | 6/2003 | Macpherson | |
| 2002/0191345 A1 | 12/2002 | Macpherson | |
| 2003/0159273 A1 | 8/2003 | Jones | |

* cited by examiner

*Primary Examiner*—A. Dexter Tugbang
*Assistant Examiner*—Tai Van Nguyen
(74) *Attorney, Agent, or Firm*—Fellers, Snider, et al.

(57) ABSTRACT

An apparatus for protecting and merging a head stack assembly with a disc stack of a data storage device. The head stack assembly comprises a cantilevered flexure which supports a transducer at a distal end thereof. A carrier includes a carrier support surface arranged to contactingly support the distal end of the flexure. A merge tool is adapted to merge the transducer with a recording surface of the disc stack. The merge tool includes a merge support surface arranged to contactingly support a medial portion of the flexure while the carrier support surface is disposed between the merge support surface and the transducer. The transducer is merged by aligning the merge support surface with the medial portion of the flexure, and using the merge support surface to displace the distal end of the flexure from the carrier support surface and advance the transducer to a final position.

12 Claims, 5 Drawing Sheets

APPARATUS FOR PROTECTING AND MERGING A HEAD STACK ASSEMBLY

FIELD OF THE INVENTION

The claimed invention relates generally to the field of data storage devices and more particularly, but not by way of limitation, to an apparatus for protecting and merging a head stack assembly with a disc stack of a data storage device.

BACKGROUND

Digital data storage devices are used to store and retrieve large amounts of user data in a fast and efficient manner. A typical data storage device uses a head stack assembly to support an array of vertically aligned data transducers adjacent recording surfaces in a disc stack.

The disc stack is rotated at a relatively high rotational velocity by a spindle motor. An actuator motor (such as a voice coil motor, VCM) pivots the head stack assembly to align the transducers with data tracks defined on the recording surfaces to write data to the tracks and retrieve previously written data from the tracks. The transducers are typically hydrodynamically supported adjacent the recording surfaces by fluidic currents established by rotation of the disc stack.

During manufacturing, it is desirable to protect the head stack assembly during handling and installation (merging) of the transducers with the recording surfaces to prevent damage to the head stack assembly and the disc stack. In devices that employ non-contact recording, it is further generally desirable to prevent contact between the transducers and the recording surfaces during the merging operation.

While various head stack assembly protection and merging methodologies have been proposed in the art, there nevertheless remains a continued need for improvements that provide enhanced protection to the head stack assembly and the disc stack, accommodate smaller dimensional sizes and clearances within the data storage device and facilitate efficient merging of the transducers. It is to these and other improvements that the claimed invention is generally directed.

SUMMARY OF THE INVENTION

Preferred embodiments of the present invention are generally directed to an apparatus for protecting and merging a head stack assembly adjacent a disc stack of a data storage device. The head stack assembly preferably includes a cantilevered flexure which supports a transducer at a distal end thereof.

In accordance with some preferred embodiments, the apparatus comprises a carrier comprising a carrier support surface arranged to continuously, contactingly support the distal end of the flexure adjacent the transducer and to permit a subsequent engagement of a medial portion of the flexure by a merge tool which disengages the flexure from the carrier support surface while merging the transducer with a recording surface.

Preferably, the carrier comprises an elongated body having a medial portion that extends adjacent the medial portion of the flexure and a distal end which supports the carrier support surface. The carrier further preferably comprises at least one retention feature which engages an edge of the head stack assembly to retain the carrier on the head stack assembly.

In accordance with other preferred embodiments, the apparatus comprises a merge tool comprising a merge support surface arranged to contactingly engage a medial portion of the flexure thereby disengaging previous contacting engagement of the distal end of the flexure by a carrier and advancing the transducer to a final position adjacent a recording surface of the disc stack.

Preferably, the merge tool comprises a main body portion and a cantilevered arm which extends from the main body portion, the cantilevered arm having a first portion configured to extend adjacent and substantially parallel to the head stack assembly a separation distance less than a maximum width of said flexure and a second portion which supports the merge support surface and extends substantially perpendicular to the head stack assembly.

In other preferred embodiments, the apparatus generally comprises both the carrier and the merge tool as described above. The apparatus preferably merges the transducer by aligning the merge support surface of the merge tool with the medial portion of the flexure, and then using the merge support surface to displace the distal end of the flexure from a carrier support surface of the carrier and advance the transducer to a final position. Preferably, the merge tool is rotated in a unitary rotational direction to advance the transducer to the final position.

These and various other features and advantages which characterize the claimed invention will become apparent upon reading the following detailed description and upon reviewing the associated drawings.

DETAILED DESCRIPTION

Figure 1:
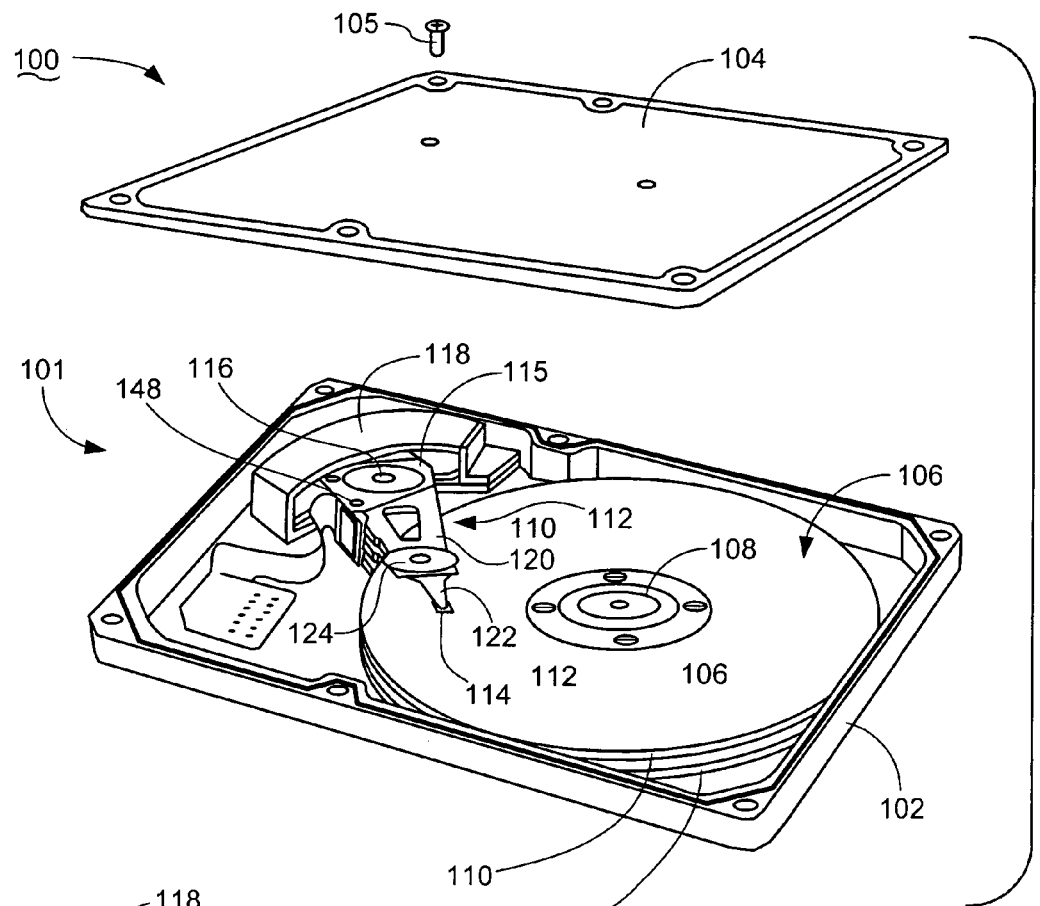
FIG. 1 is an exploded, perspective view of a data storage device constructed in accordance with preferred embodiments of the present invention.

While the claimed invention has utility in any number of different applications, FIG. 1 has been provided to illustrate a particularly suitable environment in which the claimed invention can be advantageously practiced.

FIG. 1 shows an exploded, perspective top plan representation of a data storage device 100 of the type used to magnetically store and retrieve computerized user data. The device 100 includes a sealable housing 101 formed from a base deck 102 and a top cover 104. The top cover 104 is secured to the base deck 102 using a number of threaded fasteners (one shown at 105).

A disc stack 106 is disposed within the housing 101 and includes a spindle motor 108 which supports and rotates a number of data recording discs 110 (in this case, two) at a constant high speed during operation. A head stack assembly 112 is disposed adjacent the disc stack 106 to support a corresponding array of data transducers 114 adjacent the disc surfaces.

The head stack assembly 112 includes a central body portion 115 that rotates about a cartridge bearing assembly 116 by operation of a voice coil motor, VCM 118. Rigid actuator arms 120 project toward the disc stack 106, and cantilevered flexures (suspension assemblies) 122 project from the actuator arms 120 to respectively support the transducers 114.

The flexures 122 are preferably attached to the actuator arms 120 using a swaging methodology. Annular element 124 is a swage plate for the top actuator arm/flexure combination.

Figure 2:
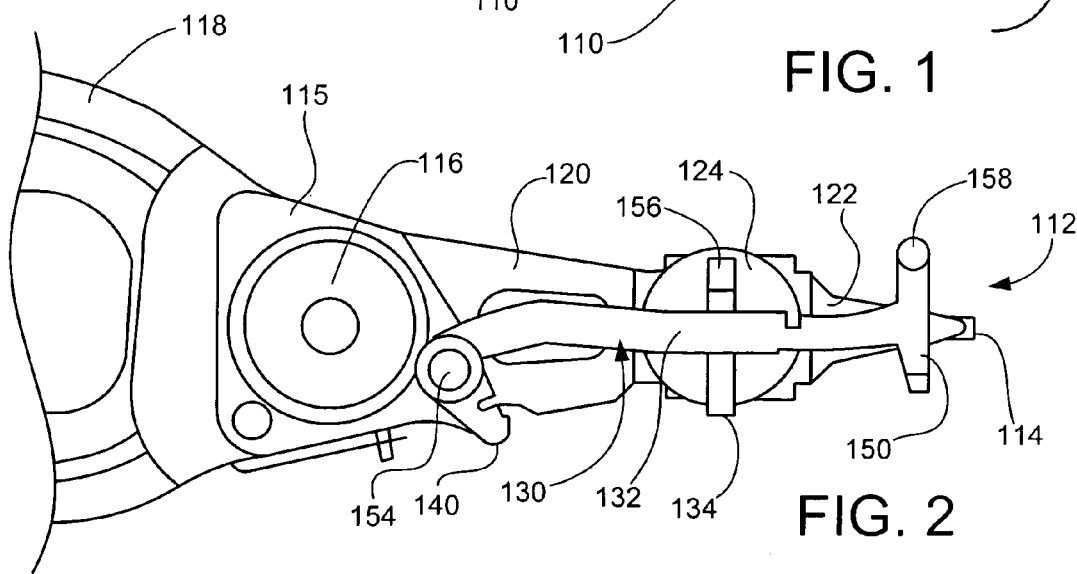
FIG. 2 is top plan view of a head stack assembly of the device of FIG. 1 in conjunction with a carrier (shipping comb) used to protect the head stack assembly during handling and installation.

FIG. 2 provides a top plan view of the head stack assembly 112 in conjunction with a carrier 130 used to protect the head stack assembly 112 during handling and installation (merging) of the transducers 114 with the disc stack 106. The carrier 130, also referred to herein as a shipping comb, includes an elongated body portion 132 which preferably extends above and along the longitudinal length of the actuator arms 120 and flexures 122.

Figure 3:
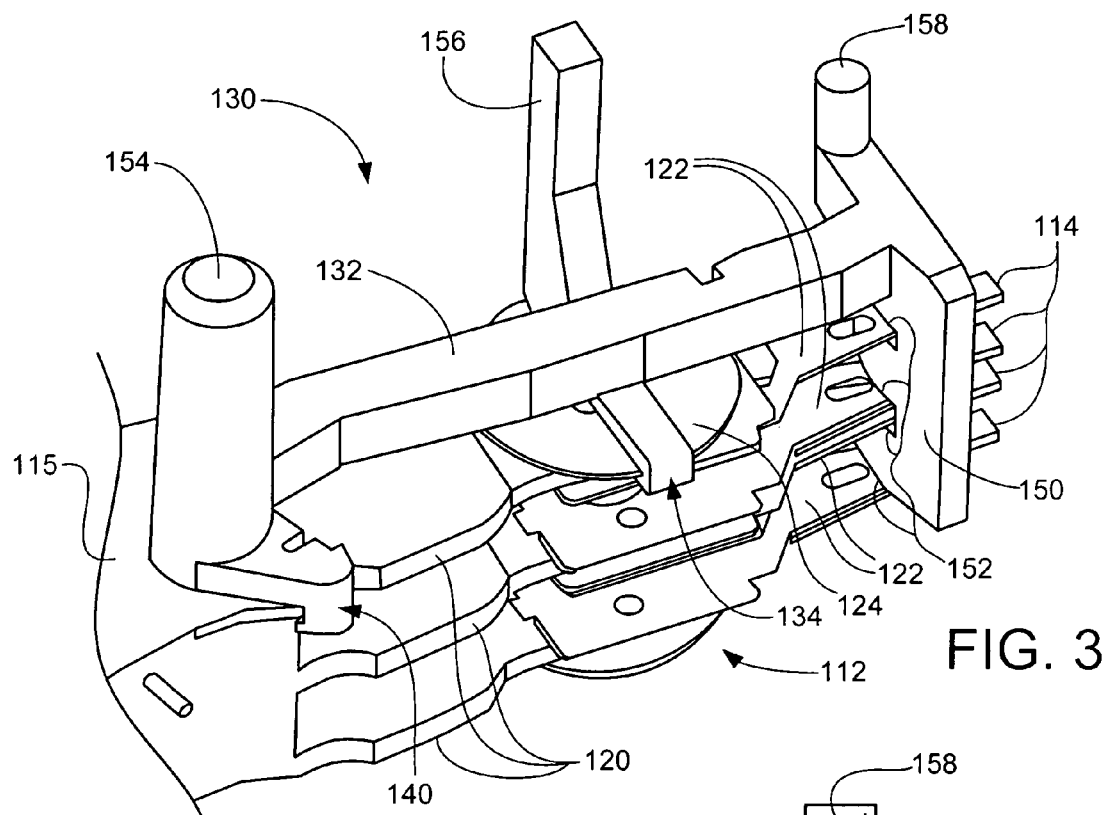
FIG. 3 is a perspective view of the head stack assembly and carrier of FIG. 2.
Figure 4:
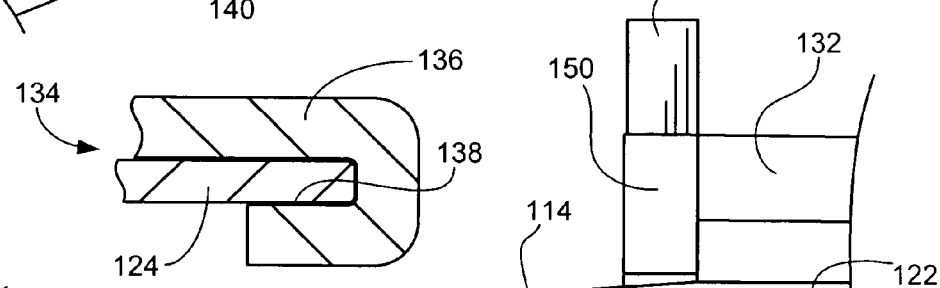
FIG. 4 is an elevational, cross-sectional view of a first retention feature of the carrier.

As further shown in FIG. 3, a first retention feature 134 of the carrier 130 includes a laterally extending flange 136 which extends from the body portion 132 in a direction away from the disc stack 106. The flange 136 forms a channel 138 which receives an edge of the swage plate 124, as depicted in FIG. 4.

Figure 5:
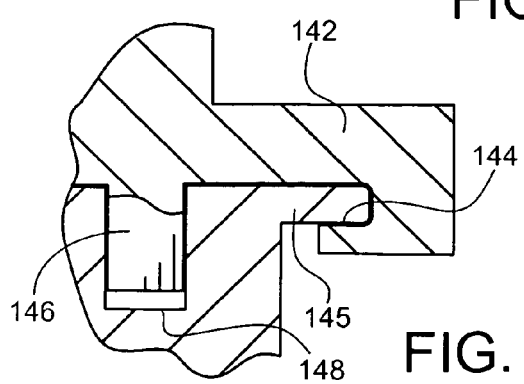
FIG. 5 is an elevational, cross-sectional view of a second retention feature of the carrier.

A second retention feature 140 includes a flange 142 which extends from the body portion 132 to form a channel 144 to receive a flange 145 extending from the central body portion 115 of the head stack assembly 112, as depicted in FIG. 5. A downwardly depending post 146 extends into an aperture 148 in the body portion 115 to further secure the carrier 130 onto the head stack assembly 112. The post 146 is best viewed in FIG. 5, and the aperture 148 can also be viewed in FIG. 1.

During placement of the carrier 130 onto the head stack assembly 112, the carrier 130 is initially aligned so that the body portion 132 is substantially perpendicular to the actuator arms 120. The carrier 130 is lowered to insert the post 146 into the aperture 148, after which the carrier 130 is rotated so that the first and second features 134, 140 engage the head stack assembly 112, resulting in the final alignment of FIGS. 2 and 3.

Figure 6:
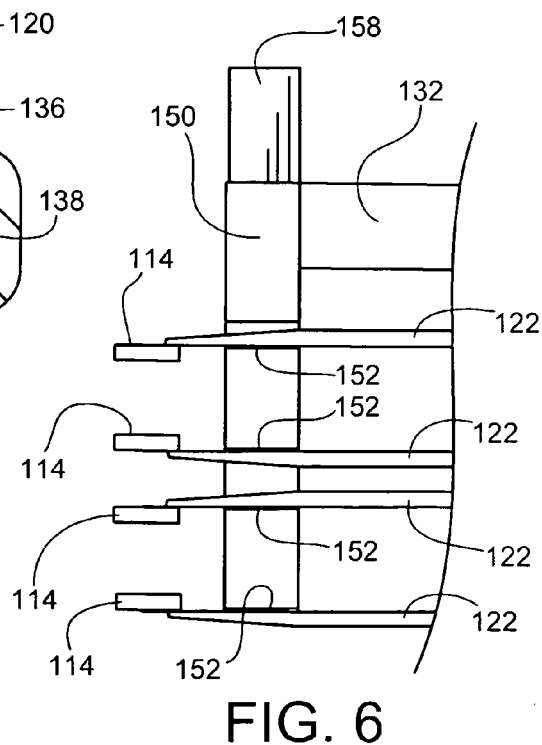
FIG. 6 shows an elevational view of the carrier to generally illustrate support surfaces that contactingly engage distal ends of flexures of the head stack assembly.

A flexure support member 150 preferably depends downwardly from the main body portion 132 of the carrier 130. The member 150 includes a number of flexure support surfaces 152 to contactingly engage the distal ends of the flexures 122 adjacent the transducers 114, as best viewed in FIG. 6.

The support surfaces 152 are preferably configured such that the surfaces 152 deflect the flexures 122 so that the flexures 122 exert a continuous spring force against the surfaces 152. In this way, the flexures 122 are continuously, contactingly supported by the support surfaces 152 until the merging operation is commenced. This reduces the potential for damage to the head stack assembly 112 during handling and installation. Posts 154, 156 and 158 project from the main body portion 132 to permit optical location and automated manipulation of the carrier 130.

Figure 7:
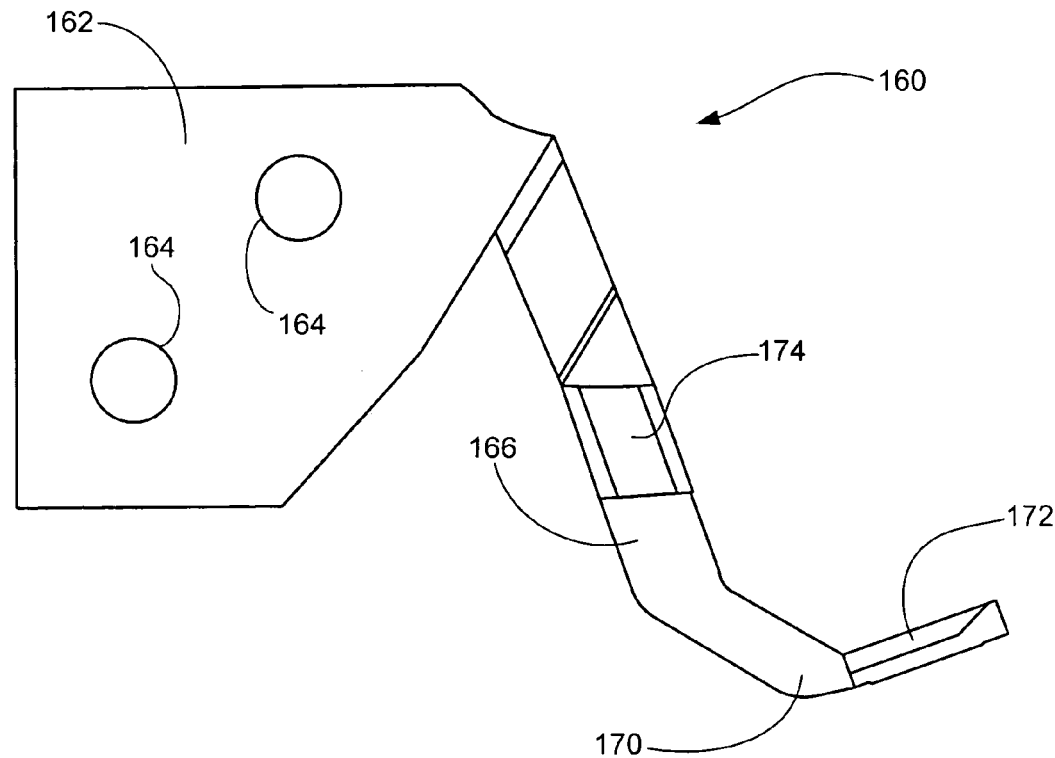
FIG. 7 provides a top plan view of a merge tool used in conjunction with the carrier of FIGS. 2-6 to merge the transducers with the disc stack of FIG. 1.

A merge tool 160 is shown in FIG. 7. The merge tool 160 is adapted for use in conjunction with the carrier 130 to merge the transducers 114 with the disc stack 106. The merge tool 160 includes a main body portion 162 with threaded apertures 164. The apertures 164 receive fasteners (not shown) to secure the tool 160 to an actuation member (also not shown) that manipulates the tool as explained below.

Figure 8:
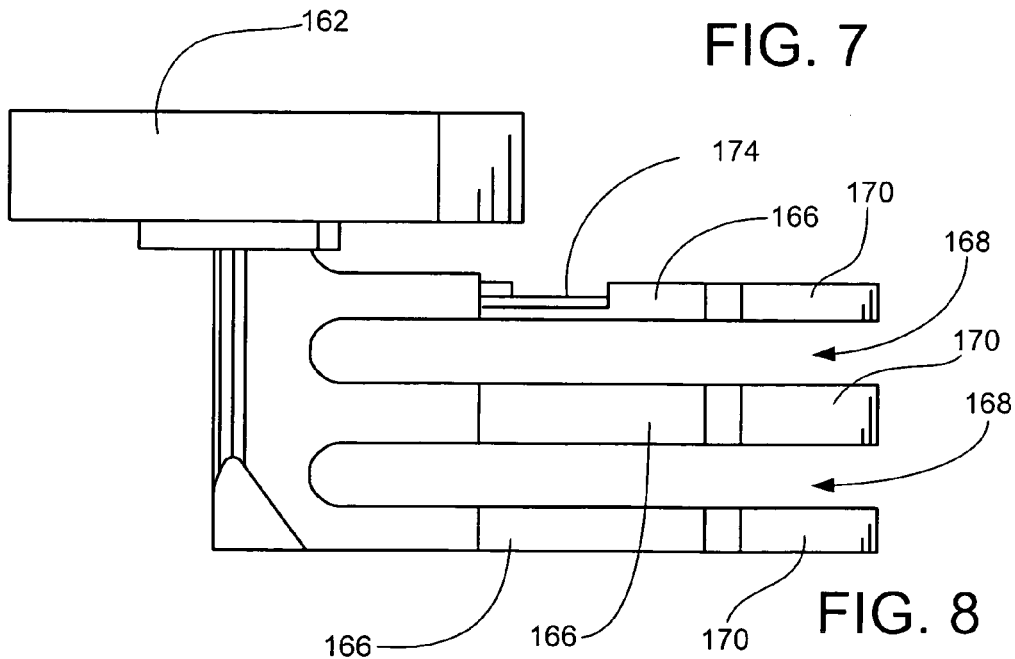
FIG. 8 is an elevational representation of the merge tool of FIG. 7.

As further shown in FIG. 8, rigid, cantilevered arms 166 extend from the merge tool body portion 162. The arms 166 project adjacent to and substantially parallel with the rigid actuator arms 120 and flexures 122 of the head stack assembly 112. Channels 168 are accordingly formed between adjacent pairs of the arms 166 to accommodate the discs 110.

Flexure support arms 170 extend from the distal ends of the arms 166 in a direction substantially perpendicular to the actuator arms 120. The flexure support arms 170 include merge support surfaces 172 which engage the flexures 122 during the merging process.

Figure 9:
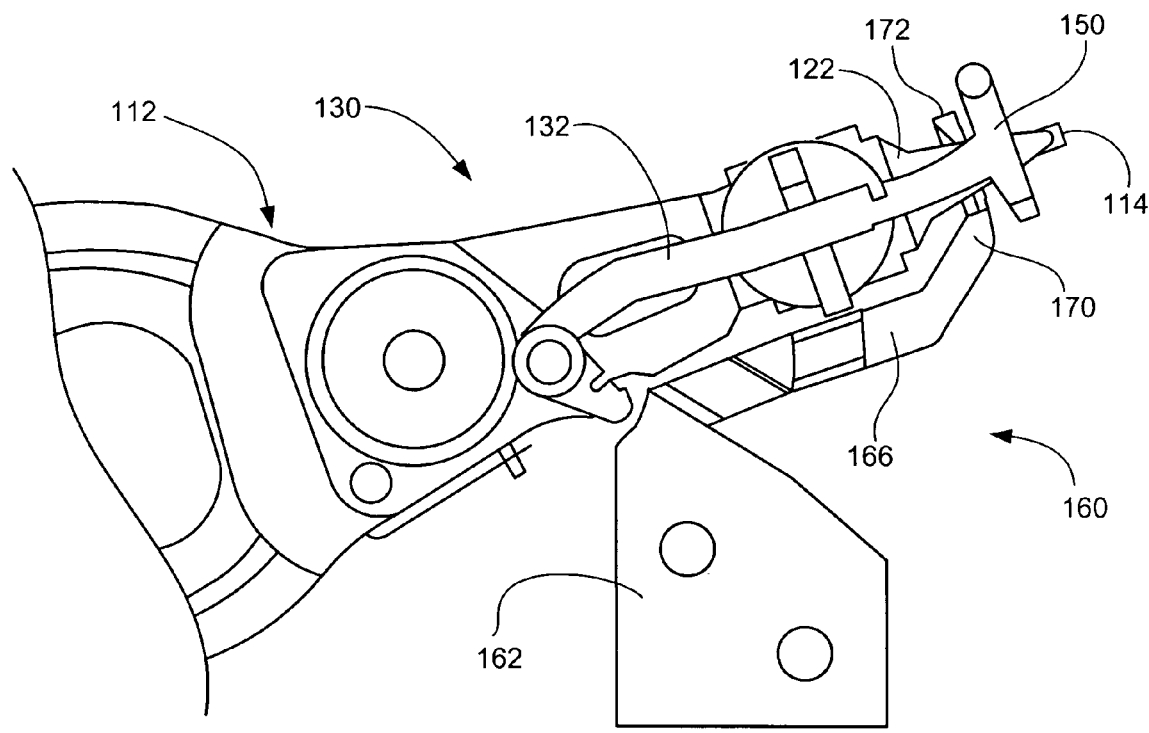
FIG. 9 illustrates the merge tool in conjunction with the carrier.
Figure 10:
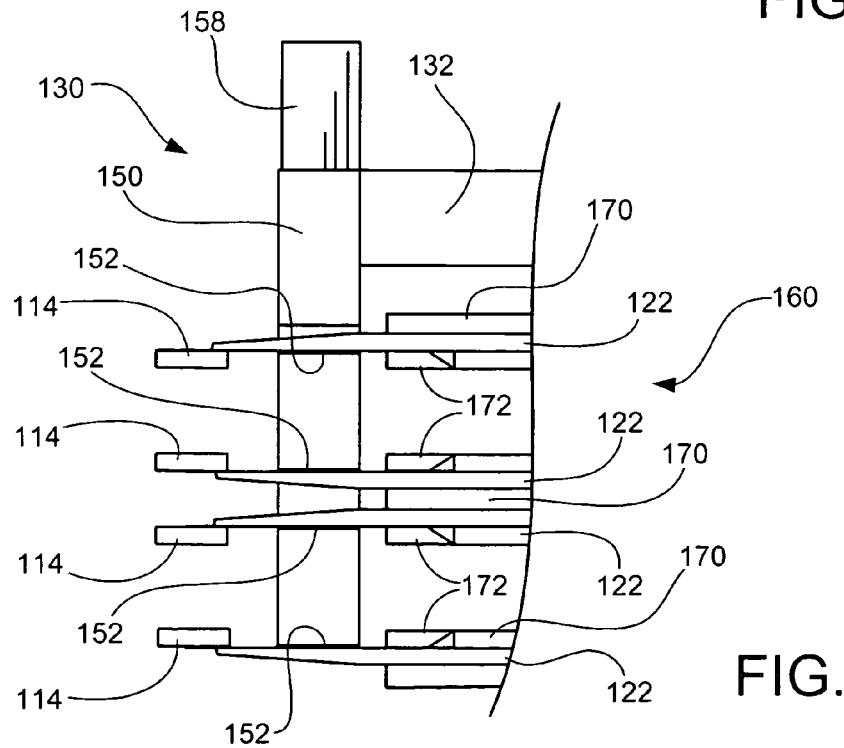
FIG. 10 provides an elevational view of the distal end of FIG. 9.

FIGS. 9 and 10 show the merge tool 160 in conjunction with the carrier 130 and head stack assembly 112. The main body portion 132 of the carrier 130 permits clearing movement of the merge tool 160 to bring the merge support surfaces 172 into proximity with the flexures 122. In this orientation, the carrier support surfaces 152 are between the merge support surfaces 172 and the transducers 144; that is, the merge support surfaces 172 are "in-board" and closer to the actuator arms 120 while the carrier support surfaces 152 are "out-board" and closer to the transducers 114. This provides enhanced protection to the transducers 114 during handling and better control during the merge process.

From FIG. 9 it will be noted that the arms 166 extend adjacent and substantially parallel to the head stack assembly 112 very close to the assembly, i.e., with a separation distance less than a maximum width of the flexure 122. The flexure support arms 170 likewise effect a substantially 90 degree turn so that the merge support surfaces 172 extends substantially perpendicular to the head stack assembly. This allows the merge tool 160 to conform largely to the shape and extent of the head stack assembly 112 and to accommodate small available areas to carry out the merging process.

Figure 11:
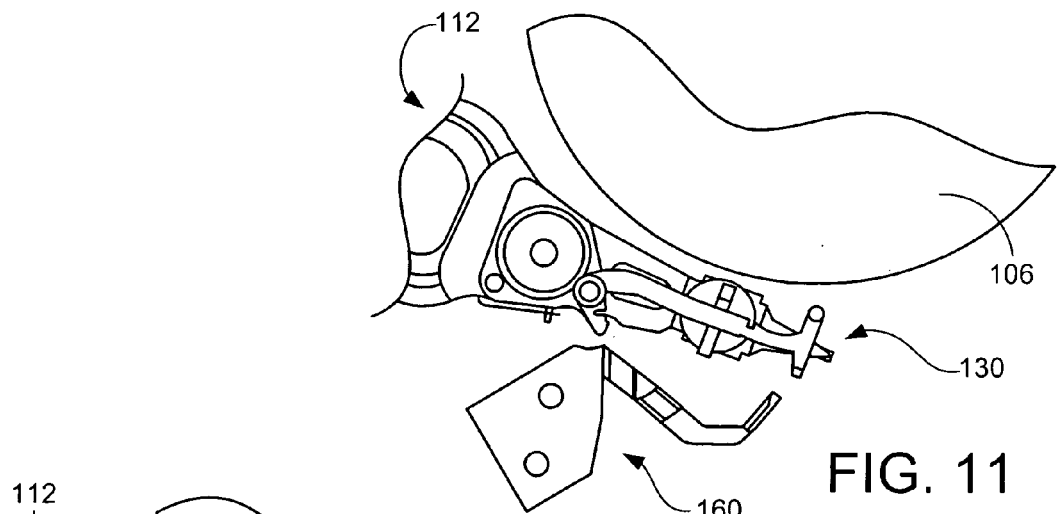
FIGS. 11-13 represent a merge sequence during which the merge tool and carrier protect the head stack assembly and disc stack during merging.

A preferred merge sequence will now be discussed with reference to FIGS. 11-13. In FIG. 11, the head stack assembly 112 is placed onto the cartridge bearing assembly 116 and the transducers 114 are located beyond the outermost diameter of the disc stack 106. The merge tool 160 is lowered into the base deck 102 at a first rotational position with the cantilevered arms 166 in clearing relation with the head stack assembly 112, as shown. It will be noted that the compact configuration of the merge tool 160 permits positioning and movement of the merge tool in a relatively small volume of space, advantageously clearing other components and features of the device 100.

Figure 12:
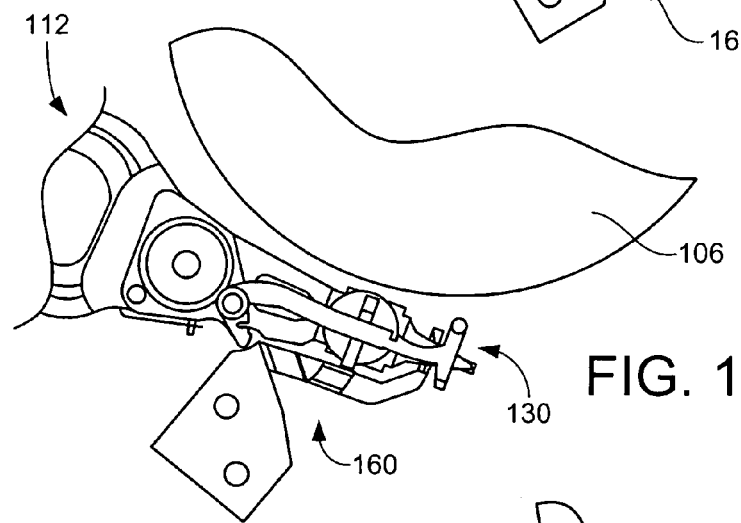

The merge tool 160 is next rotated to a second rotational position as shown by FIG. 12 (which generally corresponds to that previously viewed in FIG. 9). In this position, the merge support surfaces 172 are aligned with the flexures 122 and the cantilevered arms 166 are proximate and substantially parallel with the actuator arms 120 and flexures 122. The head stack assembly 112 remains substantially in the same orientation as FIG. 11 (i.e., the transducers 114 remain beyond the outermost diameter of the disc stack 106).

Rotation of the merge tool 160 to the second position of FIG. 12 is preferably carried out in such a way as to not induce damage to the flexures 122 as a result of, for example, contact between the edges of the flexures 122 and the support arms 170 of the merge tool 160. The merge support surfaces 172 are each preferably provided with a tapered leading edge to minimize the potential for undesired flexure edge contact, as well as to provide a controlled surface along which the flexure can be advanced as the merge support surface 172 rotates into place.

In some embodiments, the merge tool 160 is oriented such that the merge support surfaces 172 rotate to the rotational position of FIG. 12 so as to be in close proximity to, but without having established contact with, the flexures 122. In this approach, the flexures 122 remain fully engaged against the carrier support surfaces 152 as before, and small gaps (not shown) are established between the merge support surfaces 172 and the carrier support surfaces 152 at this point.

However, since the novel relative arrangement of the carrier support surfaces 152 and merge comb support surfaces 172 as presented herein serves to maintain the distal ends of the flexures 122 at known, pre-established elevations, it is contemplated that the merge support surfaces 172 preferably engage and lift the flexures off of the carrier support surfaces 152 (partially or completely) as the merge tool 160 is moved to the position of FIG. 12.

Figure 13:
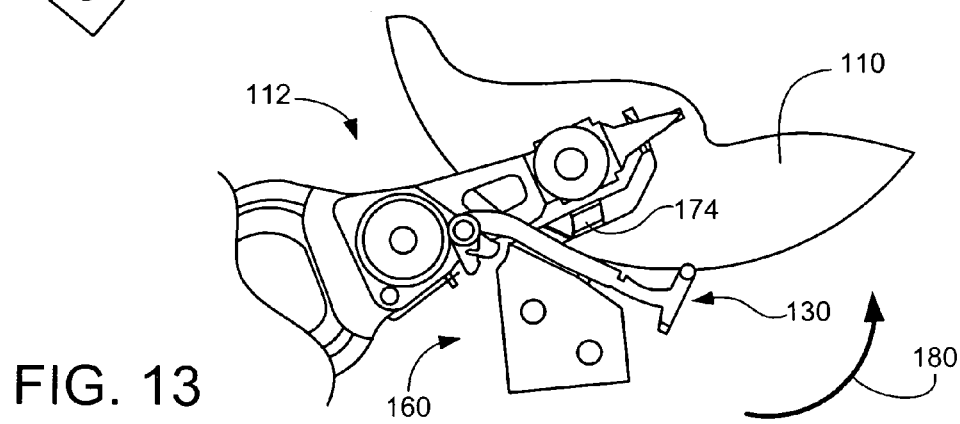

Once the merge tool 160 has engaged the head stack assembly 112, the merge tool 160 is further rotated to a third position such as represented by FIG. 13 to merge the transducers 114 with the disc stack 106. Preferably, a non-operational merge technique is performed in that the discs 110 are stationary and the merge tool 160 advances the transducers 114 onto a texturized landing zone (not shown) near the innermost diameter of the disc stack 106, although other final orientations of the transducers 114 can be achieved as well such as, for example, placement of the transducers 114 onto load/unload ramps, etc.

As the merge tool 160 advances the transducers 114, the carrier 130 contactingly engages the edges of the discs 110, which impedes further inward movement of the carrier 130. The retention features 134, 140 thus disengage while the merge support surfaces 172 continue to advance the flexures 122 inwardly. Clearance groove 174 in the top arm 166 permits clearing movement between the top arm 166 and the retention flange 136 of the carrier 130.

For reference, as desired the merge tool 160 can be provided with an additional feature (not shown) that engages another portion of the head stack assembly 112 (such as one of the rigid actuator arms 120) to further apply a rotational force to the head stack assembly to controllably move the assembly during the merging operation. In this way, the force required to advance the head stack assembly 112 and disengage the features 134, 140 is not borne solely upon the flexures 122 by the merge support surfaces 172.

Once the transducers 114 are advanced to the final desired position, the merge tool 160 retracts and the carrier 130 is removed from the head stack assembly 112. It will be noted that the merge tool is sequentially rotated in a common, unitary rotational direction through FIGS. 11-13, as indicated by arrow 180. After the transducers 114 are placed in the final desired position, the merge tool is retracted in the opposite rotational direction.

It will now be appreciated that the foregoing embodiments provide several advantages over the prior art. In the present disclosure, the relative locations of the carrier support surfaces 152 and the merge support surfaces 172 are provided so that the carrier 130 supports the flexures 122 at the distal ends thereof adjacent the transducers 114 and the carrier 130 is "between" the transducers 114 and the merge tool 160. This is in contrast to prior art arrangements wherein these relative locations are reversed, advantageously providing improved control and protection for the head stack assembly in that the remaining distance along which the flexures/transducers remain unsupported is substantially reduced.

Also, better retention of the carrier on the head stack assembly can be generally obtained since the carrier is affixed along a longer effective length of the head stack assembly. Note that the carrier 130 disclosed herein is affixed in four different locations along the length of the head stack assembly 112: the post 146, the two retention features 134, 140, and the carrier support surfaces 152.

Another advantage is the fact that, since the carrier "fixes" the locations (elevations) of the distal ends of the cantilevered flexures, the potential risk of damage due to undesired contact between the edges of the flexures and the merge tool is greatly reduced as compared to solutions where the merge tool engages the cantilevered ends of the flexures (on the transducer side of the flexures). This is particularly useful in smaller diameter drives with substantially reduced tolerances and ranges for error.

Still another advantage is the manner in which the merge tool passes under and through the carrier during merging. This ensures proper handoff control of the flexures and greater precision in transducer placement while requiring a relatively small area within the base deck confines to operate.

In view of the foregoing discussion, it will now be appreciated that the present invention, as embodied herein and as claimed below, is generally directed to an apparatus for protecting and installing a head stack assembly (such as 112) having a cantilevered flexure (such as 122) which supports a transducer (such as 114) at a distal end thereof.

In accordance with some preferred embodiments, the apparatus comprises a carrier (such as 130) comprising a carrier support surface (such as 152) arranged to continuously, contactingly support the distal end of the flexure adjacent the transducer and to permit a subsequent engagement of a medial portion of the flexure by a merge tool (such as 160) which disengages the flexure from the carrier support surface while merging the transducer with a recording surface (such as 110).

Preferably, the carrier comprises an elongated body (such as 132) having a medial portion that extends adjacent the medial portion of the flexure and a distal end which supports the carrier support surface. The carrier further preferably comprises at least one retention feature (such as 134, 140) which engages an edge of the head stack assembly to retain the carrier on the head stack assembly.

In accordance with other preferred embodiments, the apparatus comprises a merge tool (such as 160) comprising a merge support surface (such as 172) arranged to contactingly engage a medial portion of the flexure thereby disengaging previous contacting engagement of the distal end of the flexure by a carrier (such as 130) and advancing the transducer to a final position adjacent a recording surface of the disc stack.

Preferably, the merge tool comprises a main body portion (such as 162) and a cantilevered arm which extends from the main body portion, the cantilevered arm having a first portion (such as 166) configured to extend adjacent and substantially parallel to the head stack assembly a separation distance less than a maximum width of said flexure and a second portion (such as 170) which supports the merge support surface and extends substantially perpendicular to the head stack assembly.

In other preferred embodiments, the apparatus generally comprises both the carrier and the merge tool as described above. The apparatus preferably merges the transducer by aligning the merge support surface of the merge tool with the medial portion of the flexure, and then using the merge support surface to displace the distal end of the flexure from a carrier support surface of the carrier and advance the transducer to a final position. Preferably, the merge tool is rotated in a unitary rotational direction to advance the transducer to the final position (such as 180).

In the appended claims, the phrase "continuously, contactingly support" will be understood consistent with the foregoing discussion to describe a configuration where a retention force is continuously applied by the support surface, as compared to a limiting or snubbing surface that is nominally spaced apart from the flexure and which merely limits an amount of deflection should the assembly be subjected to mechanical shock, etc.

It will be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the claimed invention.

What is claimed is:

1. An apparatus comprising a carrier adapted to protect a head stack assembly comprising a cantilevered flexure which supports a transducer at a distal end thereof, the carrier comprising a carrier support surface arranged to continuously, contactingly support the distal end of the flexure adjacent the transducer and to permit a subsequent engagement of a medial portion of the flexure by a merge tool which disengages the flexure from the carrier support surface while merging the transducer with a recording surface, wherein the carrier further comprises a retention feature which engages an edge of the head stack assembly to retain the carrier on the head stack assembly, the retention feature comprising a flange which forms a channel, the channel engaging the edge of the head stack assembly.

2. The apparatus of claim 1, wherein the carrier further comprises an elongated body having a medial portion that extends adjacent the medial portion of the flexure and a distal end which supports the carrier support surface.

3. The apparatus of claim 1, further comprising the carrier in combination with the merge tool.

4. The apparatus of claim 3, wherein the merge tool comprises a main body portion and a cantilevered arm which extends from the main body portion, the cantilevered arm having a first portion configured to extend adjacent and substantially parallel to the head stack assembly a separation distance less than a maximum width of said flexure and a second portion which extends substantially perpendicular to the head stack assembly.

5. The apparatus of claim 4, wherein the merge tool further comprises a merge support surface which extends from the second portion of the cantilevered arm, the merge support surface adapted to engage the medial portion of the flexure while the distal end of the flexure remains supported by the carrier support surface.

6. An apparatus comprising a merge tool adapted to install a head stack assembly adjacent a disc stack, the head stack assembly comprising a cantilevered flexure which supports a transducer at a distal end thereof, the merge tool comprising a merge support surface arranged to contactingly engage a medial portion of the flexure thereby disengaging previous contacting engagement of the distal end of the flexure by a carrier and advancing the transducer to a final position adjacent a recording surface of the disc stack, wherein the merge tool further comprises a main body portion and a cantilevered arm which extends from the main body portion, the cantilevered arm having a first portion configured to extend adjacent and substantially parallel to the head stack assembly a separation distance less than a maximum width of said flexure and a second portion which supports the merge support surface and extends substantially perpendicular to the head stack assembly.

7. The apparatus of claim 6, further comprising the merge tool in combination with the carrier.

8. The apparatus of claim 7, wherein the carrier comprises an elongated body having a medial portion that extends adjacent the medial portion of the flexure and a distal end which supports a carrier support surface which contactingly engages the distal end of the flexure.

9. The apparatus of claim 7, wherein the carrier further comprises a retention feature which engages an edge of the head stack assembly to retain the carrier on the head stack assembly.

10. An apparatus, comprising:
a carrier adapted to protect a head stack assembly comprising a cantilevered flexure which supports a transducer at a distal end thereof, the carrier comprising a carrier support surface arranged to contactingly support the distal end of the flexure by continuous deflection of said distal end; and
a merge tool adapted to merge the transducer with a recording surface comprising a merge support surface arranged to contactingly support a medial portion of the flexure while the carrier support surface is disposed between the merge support surface and the transducer, the merge tool comprising a main body portion and a cantilevered arm which extends from the main body portion, the cantilevered arm having a first portion configured to extend adjacent and substantially parallel to the head stack assembly a separation distance less than a maximum width of said flexure and a second portion which extends substantially perpendicular to the head stack assembly.

11. The apparatus of claim 10, wherein the carrier further comprises an elongated body having a medial portion that extends adjacent the medial portion of the flexure and a distal end which supports the carrier support surface.

12. The apparatus of claim 10, wherein the carrier further comprises a retention feature which engages an edge of the head stack assembly to retain the carrier on the head stack assembly.

* * * * *